US011732939B2

(12) United States Patent
Zhai et al.

(10) Patent No.: US 11,732,939 B2
(45) Date of Patent: Aug. 22, 2023

(54) DETECTION APPARATUS AND METHOD FOR REFRIGERANT LEAKAGE OF AIR SOURCE HEAT PUMP SYSTEM

(71) Applicant: Carrier Corporation, Palm Beach Gardens, FL (US)

(72) Inventors: Hui Zhai, Shanghai (CN); Runfu Shi, Shanghai (CN); Xiangyu Gao, Shanghai (CN); Guangyu Shen, Shanghai (CN); YuHui Kuang, Shanghai (CN); Yu Zhu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1158 days.

(21) Appl. No.: 16/381,792

(22) Filed: Apr. 11, 2019

(65) Prior Publication Data

US 2019/0316820 A1 Oct. 17, 2019

(30) Foreign Application Priority Data

Apr. 13, 2018 (CN) .......................... 201810329986.5

(51) Int. Cl.
*F24F 11/36* (2018.01)
*F25B 49/00* (2006.01)
*F25B 30/02* (2006.01)

(52) U.S. Cl.
CPC ............ *F25B 49/005* (2013.01); *F24F 11/36* (2018.01); *F25B 30/02* (2013.01);
(Continued)

(58) Field of Classification Search
CPC ......... F24F 11/36; F25B 30/02; F25B 49/005; F25B 2313/031; F25B 2339/047; F25B 2500/222; F25B 2700/171
See application file for complete search history.

(56) References Cited

U.S. PATENT DOCUMENTS 5,241,833 A * 9/1993 Ohkoshi .................. F24F 11/61
62/211
7,631,508 B2 12/2009 Braun et al.
(Continued)

FOREIGN PATENT DOCUMENTS

CN 202769873 U 3/2013
CN 106524418 A 3/2017
(Continued)

OTHER PUBLICATIONS

Chinese Office Action for Application No. 201810329986.5; dated Nov. 24, 2021; 10 Pages.
(Continued)

*Primary Examiner* — Jonathan Bradford
(74) *Attorney, Agent, or Firm* — Cantor Colburn LLP

(57) ABSTRACT

An apparatus and a method for detecting refrigerant leakage in an air source heat pump system. The method for detecting refrigerant leakage in an air source heat pump system includes the following steps in a cooling mode: S110: obtaining a running parameter of an air source heat pump system, wherein the running parameter at least includes a compressor rotational speed; S120: comparing the running parameter with a preset running parameter range; S130: updating a cumulative score when the running parameter falls within the preset running parameter range; and S140: when the cumulative score exceeds a predetermined cumulative score, determining that refrigerant leakage occurs, and when the cumulative score does not exceed the predetermined cumulative score, return to step S110.

15 Claims, 5 Drawing Sheets

(52) U.S. Cl.
CPC ... *F25B 2313/031* (2013.01); *F25B 2500/222* (2013.01); *F25B 2700/171* (2013.01); *F25B 2700/1931* (2013.01); *F25B 2700/21161* (2013.01)

(56) References Cited

U.S. PATENT DOCUMENTS

| | | | |
|---|---|---|---|
| 8,109,104 | B2 | 2/2012 | Doll et al. |
| 9,453,671 | B2 | 9/2016 | Shimazu |
| 9,869,499 | B2 | 1/2018 | Liu et al. |
| 2007/0204635 | A1* | 9/2007 | Tanaka ............. F25B 13/00 62/129 |
| 2011/0112814 | A1 | 5/2011 | Clark |
| 2012/0234030 | A1* | 9/2012 | Hagita ............. F25B 49/025 62/129 |
| 2015/0204590 | A1 | 7/2015 | Baik et al. |
| 2016/0103457 | A1 | 4/2016 | Maughan et al. |
| 2016/0109170 | A1 | 4/2016 | Schrey et al. |
| 2016/0146488 | A1 | 5/2016 | Ochiai et al. |
| 2016/0356534 | A1 | 12/2016 | Hatada et al. |
| 2017/0268811 | A1 | 9/2017 | Ochiai et al. |

FOREIGN PATENT DOCUMENTS

| | | | |
|---|---|---|---|
| CN | 107062546 | A | 8/2017 |
| CN | 107272642 | A | 10/2017 |
| CN | 107289599 | A | 10/2017 |
| CN | 107576112 | A | 1/2018 |
| EP | 0749856 | A2 | 12/1996 |
| EP | 0837293 | A2 | 4/1998 |
| EP | 1014013 | A1 | 6/2000 |
| EP | 2354724 | A2 | 11/2014 |
| JP | 2017053566 | A | 3/2017 |
| KR | 20130022464 | A * | 3/2013 |
| KR | 20140099747 | | 8/2014 |

OTHER PUBLICATIONS

European Search Report for application EP 19167041.3, dated Jun. 25, 2019, 7 pages.

RefriApp, "Refrigerant leaks remote detection LECOsystem", LECOsystem, available at: http://refriapp.es/en/products/lecosystem/, accessed: Mar. 26, 2018, 7 pages.

* cited by examiner

DETECTION APPARATUS AND METHOD FOR REFRIGERANT LEAKAGE OF AIR SOURCE HEAT PUMP SYSTEM

The present invention relates to a method and an apparatus for detecting refrigerant leakage in an air source heat pump system, which is used for detecting whether leakage occurs in a refrigeration system.

It is known that air source heat pump systems often use refrigerant to carry out thermal cycle operations. An air source heat pump system typically has a heating mode and a cooling mode, and can switch between different running modes. In the running process, the refrigerant in a pipeline may leak due to various reasons. Such leakage may cause shutdown of single-cold modules, resulting in economic losses, air pollution, and maintenance costs.

Existing air source heat pump systems does not have the ability to automatically detect refrigerant leakage. Although leakage can be detected by using a special device, such detection is time and labor consuming.

Hence, it is expected to provide an apparatus and a method for detecting refrigerant leakage in an air source heat pump system, to automatically detect occurrence of refrigerant leakage while reducing operating costs.

Viewed from a first aspect, the invention provides a method for detecting refrigerant leakage in an air source heat pump system, including the following steps: (i): obtaining a running parameter of an air source heat pump system, where the running parameter at least includes a compressor rotational speed or capacity; (ii): comparing the running parameter with a preset running parameter range; (iii): updating a cumulative score when the running parameter falls within the preset running parameter range; and (iv): when the cumulative score exceeds a predetermined cumulative score, determining that refrigerant leakage occurs, and when the cumulative score does not exceed the predetermined cumulative score, return to step (i).

The method may be carried out with the air source heat pump system in a heating mode or in a cooling mode.

Optionally, in step (ii), when the air source heat pump system has been running for a first predetermined time and an absolute value of a water inlet/outlet temperature difference is less than a first predetermined value, the compressor rotational speed or capacity is compared with a predetermined rotational speed or capacity; and in step (iii), when the compressor rotational speed or capacity is greater than or equal to the predetermined rotational speed or capacity, the cumulative score is increased by a first score, and when the compressor rotational speed or capacity is less than the predetermined rotational speed or capacity, return to step (i).

Optionally, in step (ii), when the air source heat pump system has been running in a cooling mode for the first predetermined time, the absolute value of the water inlet/outlet temperature difference is not less than the first predetermined value, the subcooling degree is less than the second predetermined value, and a degree of opening of an expansion valve is equal to a predetermined degree of opening, a superheating degree is compared with a sum of a set superheating degree value and a third predetermined value; and in step (iii), when the superheating degree is greater than the sum of the set superheating degree value and the third predetermined value, the cumulative score is increased by a second score, and when the superheating degree is not greater than the sum of the set superheating degree value and the third predetermined value, return to step (i).

Optionally, in step (ii), when the air source heat pump system has been running in a cooling mode for the first predetermined time, the absolute value of the water inlet/outlet temperature difference is not less than the first predetermined value, the subcooling degree is less than the second predetermined value, and the degree of opening of the expansion valve is not equal to 100%, a compressor discharge pressure is compared with a first predetermined pressure; and in step (iii), when the compressor discharge pressure is less than the first predetermined pressure, the cumulative score is increased by a third score, and when the compressor discharge pressure is not less than the first predetermined pressure, return to step (i).

Optionally, in step (ii), when the air source heat pump system has been running in a cooling mode for the first predetermined time, the absolute value of the water inlet/outlet temperature difference is not less than the first predetermined value, and the subcooling degree is not less than the second predetermined value, the subcooling degree is compared with a predetermined subcooling degree; and in step (iii), when the subcooling degree is less than the predetermined subcooling degree, the cumulative score is increased by a fourth score, and when the subcooling degree is not less than the predetermined subcooling degree, return to step (i).

Optionally, the method further includes the following steps: comparing a compressor discharge pressure with a second predetermined pressure when a second predetermined time has elapsed after shutdown of the air source heat pump system; and determining that refrigerant leakage occurs when the compressor discharge pressure is less than the second predetermined pressure.

Optionally, in step (ii), the preset running parameter range is a preset value, a preset table, or a preset chart.

Optionally, the method further includes step (v): sending an alarm signal if it is determined that refrigerant leakage occurs.

Optionally, the first predetermined value is 1 degree Celsius.

Optionally, in the case of a cooling mode, step (i) includes obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, a subcooling degree, a superheating degree, and a compressor discharge pressure.

Optionally, in step (ii), when the air source heat pump system has been running in a heating mode for the first predetermined time, the absolute value of the water inlet/outlet temperature difference is not less than the first predetermined value, and a degree of opening of an expansion valve is equal to a predetermined degree of opening, a superheating degree is compared with a sum of a set superheating degree value and a third predetermined value; and in step (iii), when the superheating degree is greater than the sum of the set superheating degree value and the third predetermined value, the cumulative score is increased by a second score, and when the superheating degree is not greater than the sum of the set superheating degree value and the second predetermined value, return to step (i).

Optionally, in step (ii), when the air source heat pump system has been running in a heating mode for the first predetermined time, the absolute value of the water inlet/outlet temperature difference is not less than the first predetermined value, the degree of opening of the expansion valve is not equal to the predetermined degree of opening, and the air source heat pump system is in a defrost mode, comparing a subcooling degree obtained when the defrost mode ends with a fourth predetermined value; and in step (iii), when the subcooling degree is less than the fourth predetermined value, the cumulative score is increased by a fifth score, and when the superheating degree is not less than the fourth predetermined value, return to step (i).

Optionally, in step (ii), when the air source heat pump system has been running in a heating mode for the first predetermined time, the absolute value of the water inlet/outlet temperature difference is not less than the first predetermined value, and the degree of opening of the expansion valve is not equal to the predetermined degree of opening, the air source heat pump system is forced to enter a cooling mode and runs for a predetermined time, and a subcooling degree obtained after the air source heat pump system runs for the predetermined time is compared with a fourth predetermined value; and in step (iii), when the subcooling degree is less than the fourth predetermined value, the cumulative score is increased by a fifth score, and when the subcooling degree is not less than the fourth predetermined value, return to step (i).

Optionally, in the case of a heating mode, step (i) includes obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, a compressor discharge pressure, and whether the air source heat pump system is in a defrost mode.

Viewed from a second aspect, the invention provides an apparatus for detecting refrigerant leakage in an air source heat pump system, wherein the apparatus is configured to execute the above-mentioned method for detecting refrigerant leakage. For example, the apparatus may comprise a controller for the air source heat pump system, wherein the controller is configured to carry out the method of the first aspect and optionally further features of the method as set out above.

The apparatus and the method for detecting refrigerant leakage in an air source heat pump system according to at least the preferred embodiments of the present invention have the advantages of being simple and reliable, easy to implement and convenient to use, and can automatically detect refrigerant leakage, thus improving the running efficiency and safety of modules.

The present invention will be further described in detail below with reference to the drawings and the preferred embodiments, but those skilled in the art will understand that the drawings are only for the purpose of explaining the preferred embodiments, and therefore should not be considered as limitations of the scope of the present invention. In addition, unless otherwise particularly specified, the drawings are only intended to be illustrative of the composition or construction of the described subject matter, and may include exaggerated illustration, and the drawings are not necessarily drawn to scale.

Figure 1:
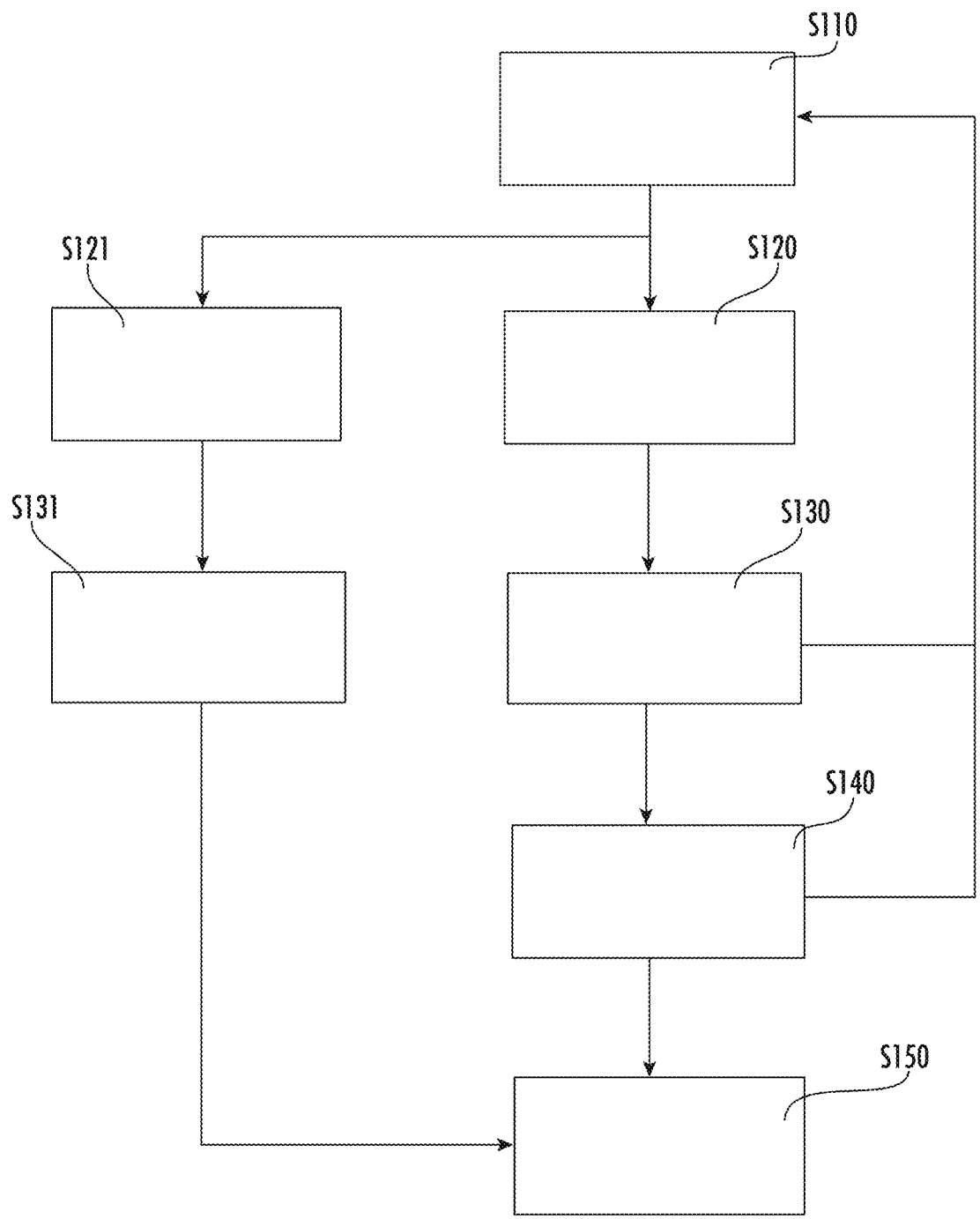
FIG. 1 is a schematic diagram of, in a cooling mode, a method for detecting refrigerant leakage in an air source heat pump system.

Preferred embodiments of the present invention will be described in detail below with reference to the accompanying drawings. Those skilled in the art will appreciate that the description is only illustrative and exemplary, and should not be construed as limiting the scope of the invention.

First, it should be noted that the terms such as top, bottom, upward and downward mentioned herein are defined with respect to the directions in the respective drawings, and as relative concepts, they can change with different positions and different states in practice. Therefore, these or other orientation terms should not be construed as limiting terms.

In addition, it should also be noted that for any single technical feature described or implied in the embodiments herein or any single technical feature shown or implied in the drawings, these technical features (or their equivalents) can still be further combined to obtain other embodiments of the present invention that are not directly mentioned herein.

It should be noted that in the different drawings, the same reference numerals refer to the same or substantially the same components.

FIG. 1 is a flowchart of, in a cooling mode, a method for detecting refrigerant leakage in an air source heat pump system. The method for detecting refrigerant leakage in an air source heat pump system includes the following steps in the cooling mode:

S110: obtaining a running parameter of an air source heat pump system, where the running parameter at least includes a compressor rotational speed or capacity;

S120: comparing the running parameter with a preset running parameter range;

S130: updating a cumulative score when the running parameter falls within the preset running parameter range; and S140: when the cumulative score exceeds a predetermined cumulative score, determining that refrigerant leakage occurs, and when the cumulative score does not exceed the predetermined cumulative score, return to step S110.

In one example, in step S120, when the air source heat pump system has been running for a first predetermined time and an absolute value of a water inlet/outlet temperature difference is less than a first predetermined value, the compressor rotational speed or capacity is compared with a predetermined rotational speed or capacity; and in step S130, when the compressor rotational speed or capacity is greater than or equal to the predetermined rotational speed or capacity, the cumulative score is increased by a first score, and when the compressor rotational speed or capacity is less than the predetermined rotational speed or capacity, return to step S110.

In another example, in step S120, when the air source heat pump system has been running for the first predetermined time, the absolute value of the water inlet/outlet temperature difference is not less than the first predetermined value, the subcooling degree is less than the second predetermined value, and a degree of opening of an expansion valve is equal to a predetermined degree of opening, a superheating degree is compared with a sum of a set superheating degree value and a third predetermined value; and in step S130, when the superheating degree is greater than the sum of the set superheating degree value and the third predetermined value, the cumulative score is increased by a second score, and when the superheating degree is not greater than the sum of the set superheating degree value and the third predetermined value, return to step S110.

In another example, in step S120, when the air source heat pump system has been running for the first predetermined time, the absolute value of the water inlet/outlet temperature difference is not less than the first predetermined value, the subcooling degree is less than the second predetermined value, and the degree of opening of the expansion valve is not equal to the predetermined degree of opening, a compressor discharge pressure is compared with a first predetermined pressure; and in step S130, when the compressor discharge pressure is less than the first predetermined pressure, the cumulative score is increased by a third score, and when the compressor discharge pressure is not less than the first predetermined pressure, return to step S110.

In another example, in step S120, when the air source heat pump system has been running for the first predetermined time, the absolute value of the water inlet/outlet temperature difference is not less than the first predetermined value, and the subcooling degree is not less than the second predetermined value, the subcooling degree is compared with a predetermined subcooling degree; and in step S130, when the subcooling degree is less than the predetermined subcooling degree, the cumulative score is increased by a fourth score, and when the subcooling degree is not less than the predetermined subcooling degree, return to step S110.

In some examples, the method further includes the following steps:

S121: comparing a compressor discharge pressure with a second predetermined pressure when a second predetermined time has elapsed after shutdown of the air source heat pump system; and S131: determining that refrigerant leakage occurs when the compressor discharge pressure is less than the second predetermined pressure.

The preset running parameter range described in step S120 may be a preset value, a preset table, or a preset chart. The preset value, preset table, or preset chart may be stored in an accessible memory.

Optionally, the method further includes step S150: sending an alarm signal if it is determined that refrigerant leakage occurs. The alarm signal may be an image signal, an audio signal, or a combination thereof.

The first predetermined value may be 1 degree Celsius.

The predetermined degree of opening may be 100%.

In an example, step S110 includes obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, a subcooling degree, a superheating degree, and a compressor discharge pressure.

In an example, an initial value of the cumulative score is 0, the first score is 5, the second score is 3, the third score is 2, and the fourth score is 1. When the cumulative score reaches 15 (that is, the predetermined cumulative score), it is determined that refrigerant leakage occurs, and a leakage alarm signal is sent.

Figure 2:
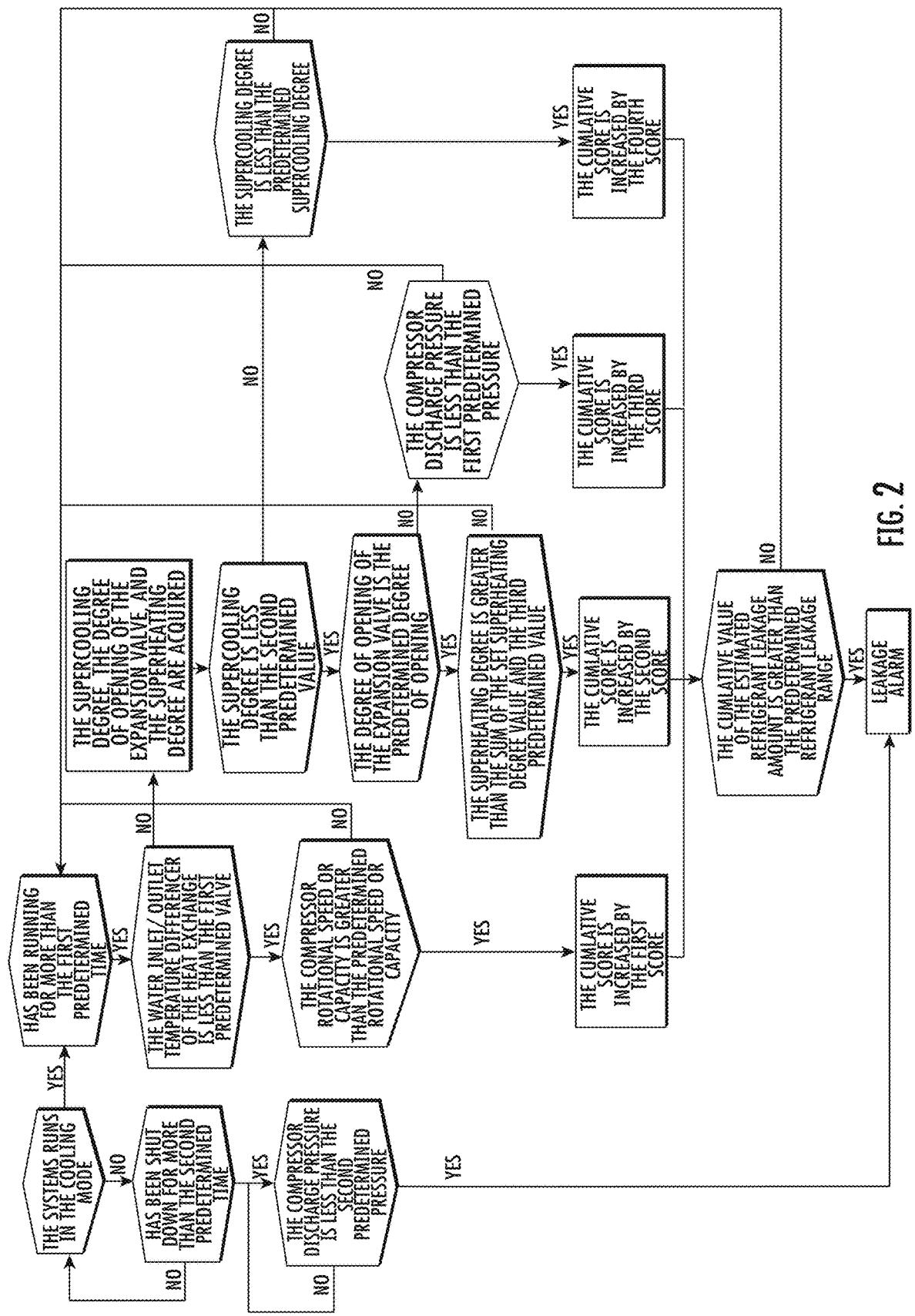
FIG. 2 is a detailed flowchart of the method shown in FIG. 1.

FIG. 2 is a detailed flowchart of the method shown in FIG. 1. When the refrigeration system is in the cooling mode, it is continuously monitored whether the refrigeration system is running. If it is found that the system has been shut down for the second predetermined time, steps S121 and S131 described above are executed, and after it is determined that refrigerant leakage occurs, an alarm signal is sent.

If it is found that the system has been running for more than the first predetermined time, it is detected whether the absolute value of the water inlet/outlet temperature difference is less than the first predetermined value. If the absolute value of the water inlet/outlet temperature difference is less than the first predetermined value, a compressor rotational speed or capacity check is executed.

If the absolute value of the water inlet/outlet temperature difference is not less than the first predetermined value, the running parameter of the air source heat pump system is obtained, including obtaining the degree of opening of the expansion valve, the subcooling degree, and the superheating degree from the air source heat pump system; and it is determined whether the subcooling degree is less than the second predetermined value. If the subcooling degree is not less than the second predetermined value, a subcooling degree check is executed.

If the subcooling degree is less than the second predetermined value, it is further determined whether the degree of opening of the expansion valve is equal to the predetermined degree of opening. If the degree of opening of the expansion valve is equal to the predetermined degree of opening, a superheating degree check is executed. If the degree of opening of the expansion valve is not equal to the predetermined degree of opening, a compressor discharge pressure check is executed.

In the above check steps, if the checked running parameters fall within the corresponding predetermined ranges, the cumulative score is increased respectively by different values. When the cumulative score reaches the predetermined cumulative score, it is determined that refrigerant leakage occurs, and an alarm signal is sent. In the compressor rotational speed or capacity check, if the compressor rotational speed or capacity is greater than or equal to a minimum rotational speed or capacity, the cumulative score is increased by the first score; in the superheating degree check, if the superheating degree is greater than the sum of the set superheating degree value and the third predetermined value, the cumulative score is increased by the second score; in the compressor discharge pressure check, if the compressor discharge pressure is less than the first predetermined pressure, the cumulative score is increased by the third score; in the subcooling degree check, if the subcooling degree is less than the predetermined subcooling degree, the cumulative score is increased by the fourth score.

The above-mentioned check steps may be used alone or in combination, and when combined, two, two or more or all of the check steps may be employed.

It is to be readily understood that, an initial value of the cumulative score is 0.

Figure 3:
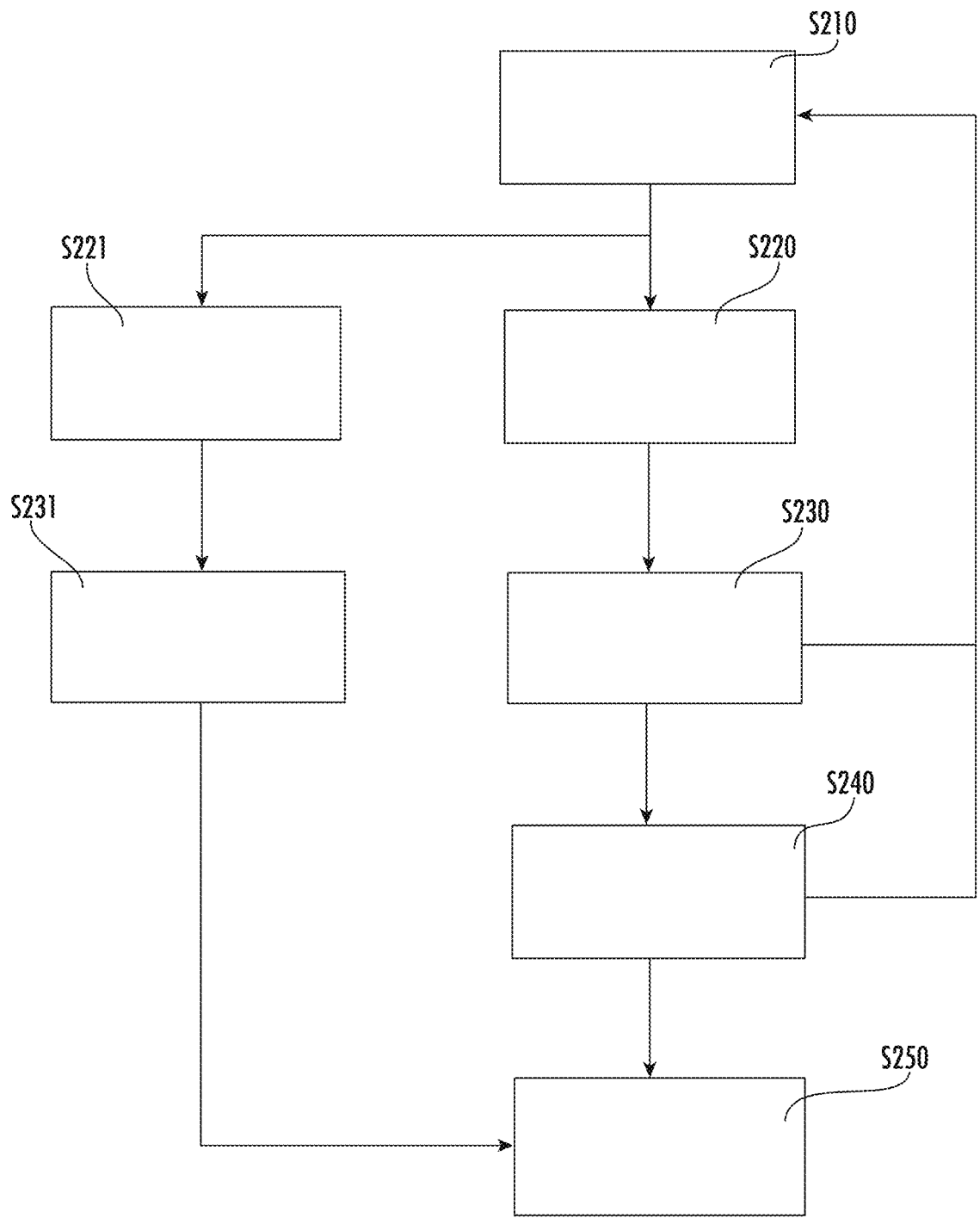
FIG. 3 is a schematic diagram of, in a heating mode, a method for detecting refrigerant leakage in an air source heat pump system.

FIG. 3 is a flowchart of a method for detecting refrigerant leakage in an air source heat pump system in a heating mode. The method includes the following steps in the heating mode:

S210: obtaining a running parameter of an air source heat pump system, where the running parameter at least includes a subcooling degree obtained when defrosting ends;

S220: comparing the running parameter with a preset running parameter range;

S230: updating a cumulative score when the running parameter falls within the preset running parameter range;

S240: when the cumulative score exceeds a predetermined cumulative score, determining that refrigerant leakage occurs, and when the cumulative score does not exceed the predetermined cumulative score, return to step S210.

In an example, in step S220, when the air source heat pump system has been running for a first predetermined time and an absolute value of a water inlet/outlet temperature difference is less than a first predetermined value, the compressor rotational speed is compared with a predetermined rotational speed or capacity; in step S230, when the compressor rotational speed or capacity is greater than or equal to the predetermined rotational speed or capacity, the cumulative score is increased by a first score, and when the compressor rotational speed or capacity is less than the predetermined rotational speed or capacity, return to step S210.

In another example, in step S220, when the air source heat pump system has been running for the first predetermined time, the absolute value of the water inlet/outlet temperature difference is not less than the first predetermined value, and a degree of opening of an expansion valve is equal to a predetermined degree of opening, a superheating degree is compared with a sum of a set superheating degree value and a third predetermined value; and in step S230, when the superheating degree is greater than the sum of the set superheating degree value and the third predetermined value, the cumulative score is increased by a second score, and when the superheating degree is not greater than the sum of the set superheating degree value and the third predetermined value, return to step S210.

In another example, in step S220, when the air source heat pump system has been running for the first predetermined time, the absolute value of the water inlet/outlet temperature difference is not less than the first predetermined value, the degree of opening of the expansion valve is not equal to the predetermined degree of opening, and the air source heat pump system is in a defrost mode, comparing a subcooling degree obtained when the defrost mode ends with a fourth predetermined value; and in step S230, when the subcooling degree is less than the fourth predetermined value, the cumulative score is increased by a fifth score, and when the superheating degree is not less than the fourth predetermined value, return to step S210.

In another example, in step S220, when the air source heat pump system has been running for the first predetermined time, the absolute value of the water inlet/outlet temperature difference is not less than the first predetermined value, and the degree of opening of the expansion valve is not equal to the predetermined degree of opening, the air source heat pump system is forced to enter a cooling mode and runs for a predetermined time, and a subcooling degree obtained after the air source heat pump system runs for the predetermined time is compared with a fourth predetermined value; and in step S230, when the subcooling degree is less than the fourth predetermined value, the cumulative score is increased by a fifth score, and when the subcooling degree is not less than the fourth predetermined value, return to step S210.

In another example, the method further includes the following steps:

S221: comparing a compressor discharge pressure with a second predetermined pressure when a second predetermined time has elapsed after shutdown of the air source heat pump system; and S231: determining that refrigerant leakage occurs when the compressor discharge pressure is less than the second predetermined pressure.

In another example, in step S220, the preset running parameter range is a preset value, a preset table, or a preset chart.

In another example, the method further includes step S250: sending an alarm signal if it is determined that refrigerant leakage occurs.

The first predetermined value may be 1 degree Celsius.

The predetermined degree of opening may be 100%.

Optionally, step S210 includes obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, and whether the air source heat pump system is in a defrost mode.

Figure 4:
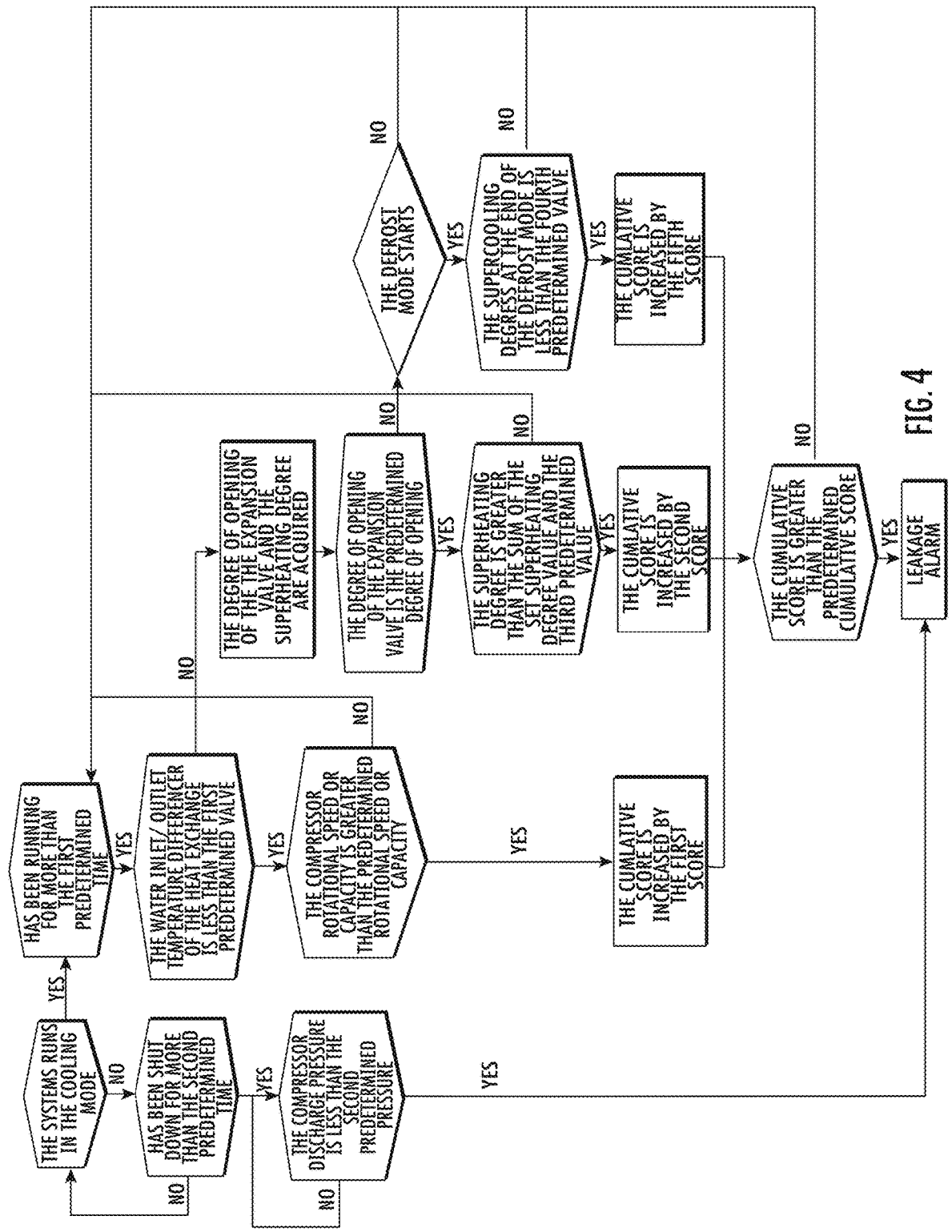
FIG. 4 is a detailed flowchart of the method shown in FIG. 3.

FIG. 4 is a detailed flowchart of the method shown in FIG. 3. When the refrigeration system is in the heating mode, it is continuously monitored whether the refrigeration system is running. If it is found that the system has been shut down for the second predetermined time, steps S221 and S231 described above are executed, and after it is determined that refrigerant leakage occurs, an alarm signal is sent.

If it is found that the system has been running for more than the first predetermined time, it is detected whether the absolute value of the water inlet/outlet temperature difference is less than the first predetermined value. If the absolute value of the water inlet/outlet temperature difference is less than the first predetermined value, a compressor rotational speed or capacity check is executed.

If the absolute value of the water inlet/outlet temperature difference is not less than the first predetermined value, the running parameter of the air source heat pump system is obtained, including obtaining the degree of opening of the expansion valve and the superheating degree from the air source heat pump system; and it is further determined whether the degree of opening of the expansion valve is equal to the predetermined degree of opening. If the degree of opening of the expansion valve is equal to the predetermined degree of opening, a superheating degree check is executed. If the degree of opening of the expansion valve is not equal to the predetermined degree of opening, a subcooling degree check in the defrost mode is executed.

In the above check steps, if the checked running parameters fall within the corresponding predetermined ranges, the cumulative score is increased respectively by different values. When the cumulative score reaches the predetermined cumulative score, it is determined that refrigerant leakage occurs, and an alarm signal is sent. In the compressor rotational speed or capacity check, if the compressor rotational speed or capacity is greater than or equal to a minimum rotational speed or capacity, the cumulative score is increased by the first score; in the superheating degree check, if the superheating degree is greater than the sum of the set superheating degree value and the third predetermined value, the cumulative score is increased by the second score; in the subcooling degree check in the defrost mode, if the subcooling degree obtained when the defrost mode ends is less than the fourth predetermined value, the cumulative score is increased by the fifth score.

Figure 5:
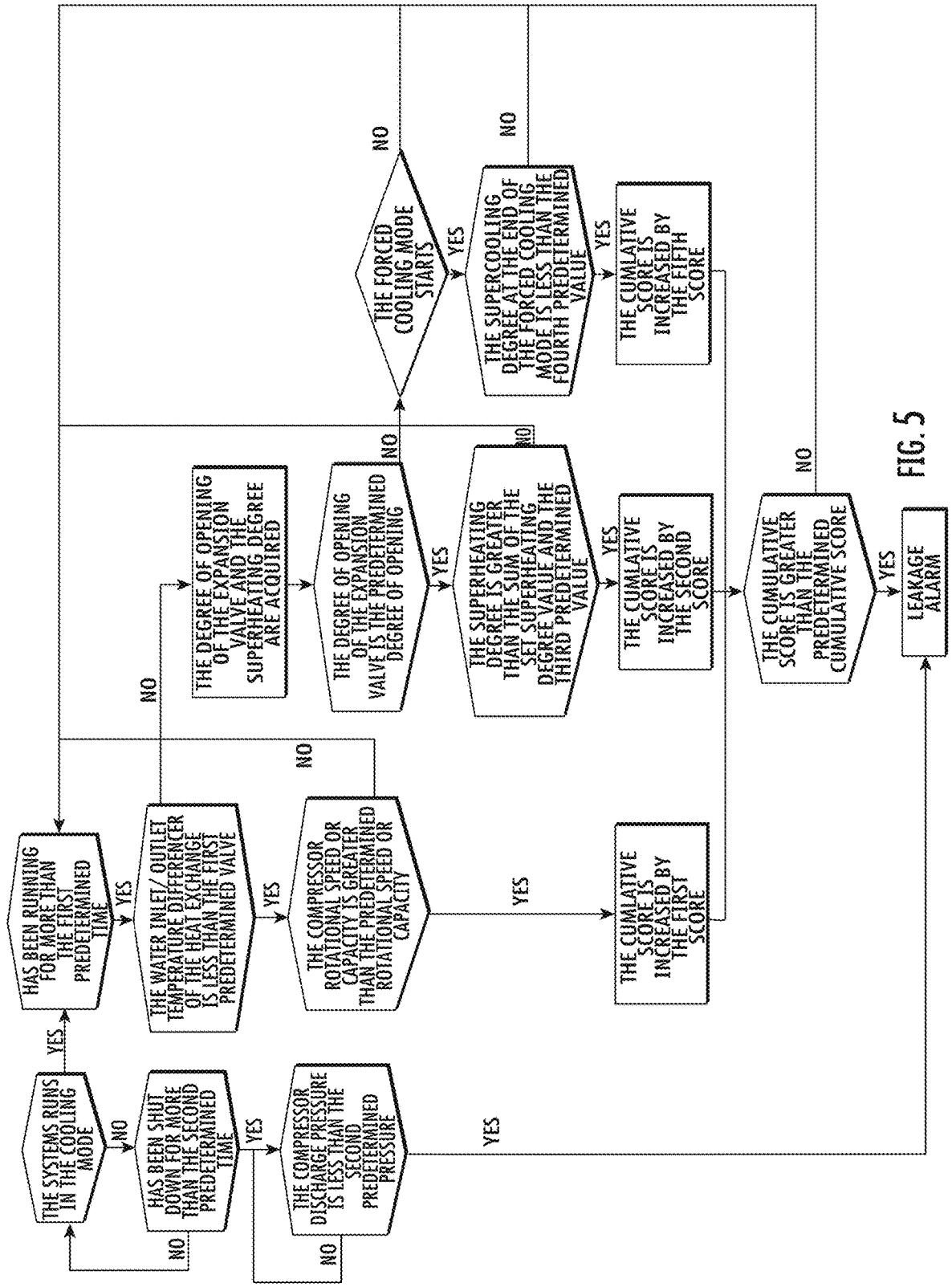
FIG. 5 is another detailed flowchart of the method shown in FIG. 3.

FIG. 5 is another detailed flowchart of the method shown in FIG. 3. If it is found that the system has been running for more than the first predetermined time, it is detected whether the absolute value of the water inlet/outlet temperature difference is less than the first predetermined value. If the absolute value of the water inlet/outlet temperature difference is less than the first predetermined value, a compressor rotational speed or capacity check is executed.

If the absolute value of the water inlet/outlet temperature difference is not less than the first predetermined value, the running parameter of the air source heat pump system is obtained, including obtaining the degree of opening of the expansion valve and the superheating degree from the air source heat pump system; and it is further determined whether the degree of opening of the expansion valve is equal to the predetermined degree of opening. If the degree of opening of the expansion valve is equal to the predetermined degree of opening, a superheating degree check is executed. If the degree of opening of the expansion valve is not equal to the predetermined degree of opening, a subcooling degree check in a forced cooling mode is executed.

In the subcooling degree check in the forced cooling mode, if the subcooling degree obtained when the forced cooling mode ends is less than the fourth predetermined value, the cumulative score is increased by the fifth score.

The above-mentioned check steps may be used alone or in combination, and when combined, two, two or more or all of the check steps may be employed.

It is to be readily understood that, an initial value of the cumulative score is 0.

The present invention also relates to an apparatus for detecting refrigerant leakage in a heat pump system, which is configured to execute the method for detecting refrigerant leakage in a heat pump system as described above.

The apparatus and the method for detecting refrigerant leakage in an air source heat pump system can be applied to a refrigeration system having cooling and heating functions, and the refrigeration system is preferably of an air source heat pump type. The apparatus and the method for detecting refrigerant leakage in an air source heat pump system can automatically detect whether refrigerant leakage occurs in the refrigeration system without using other devices that require manual operation, thus effectively improving the operating efficiency of the refrigeration system, and providing good economic benefits.

This specification discloses example embodiments the present invention with reference to the drawings, and also enables those skilled in the art to practice the present invention, including making and using any device or module, selecting suitable materials, and using any combination. The scope of the present invention is defined by the claims.

What is claimed is:

1. A method for detecting refrigerant leakage in an air source heat pump system, the method comprising the following steps:
   determining a first operating condition in which the air source heat pump system runs for a predetermined period of time;
   determining a second operating condition in which an absolute value of a water inlet/outlet temperature difference is less than a first predetermined value;
   (i): obtaining a running parameter of the air source heat pump system, wherein the running parameter at least comprises a compressor rotational speed or capacity;
   (ii): comparing the running parameter with a preset running parameter range;
   (iii): updating a cumulative score when the running parameter falls within the preset running parameter range; and
   (iv): responsive to the cumulative score exceeding a predetermined cumulative score, determining that refrigerant leakage occurs, and responsive to the cumulative score not exceeding the predetermined cumulative score, returning to step (i);
   wherein steps (i)-(iv) are applied responsive to determining the first operating condition and determining the second operating condition.

2. The method for detecting refrigerant leakage according to claim 1, wherein:
   in step (ii), responsive to determining the first operating condition and determining the second operating condition, comparing the compressor rotational speed or capacity with a predetermined rotational speed or capacity; and
   in step (iii), responsive to determining that the compressor rotational speed or capacity is greater than or equal to the predetermined rotational speed or capacity, increasing the cumulative score by a first score, and responsive to determining that the compressor rotational speed or capacity is less than the predetermined rotational speed or capacity, returning to step (i).

3. The method for detecting refrigerant leakage according to claim 2, wherein,
   in step (ii), responsive to determining the first operating condition in a cooling mode, responsive to determining a third operation condition in which the absolute value of the water inlet/outlet temperature difference is not less than the first predetermined value, responsive to determining that a subcooling degree is less than a second predetermined value, and responsive to determining that a degree of opening of an expansion valve reaches a predetermined degree of opening, comparing a superheating degree with a sum of a set superheating degree value and a third predetermined value; and
   in step (iii), responsive to determining that the superheating degree is greater than the sum of the set superheating degree value and the third predetermined value, increasing the cumulative score by a second score, and responsive to determining that the superheating degree is not greater than the sum of the set superheating degree value and the third predetermined value, returning to step (i).

4. The method for detecting refrigerant leakage according to claim 3, wherein,
   in step (ii), responsive to determining the first operating condition in the cooling mode, responsive to determining the third operating condition, responsive to determining that the subcooling degree is less than the second predetermined value, and responsive to determining that the degree of opening of the expansion valve is not equal to the predetermined degree of opening, comparing a compressor discharge pressure with a first predetermined pressure; and
   in step (iii), responsive to determining that the compressor discharge pressure is less than the first predetermined pressure, increasing the cumulative score by a third score, and responsive to determining that the compressor discharge pressure is not less than the first predetermined pressure, returning to step (i).

5. The method for detecting refrigerant leakage according to claim 4, wherein,
   in step (ii), responsive to determining the first operating condition in the cooling mode, responsive to determining the third operating condition, and responsive to determining that the subcooling degree is not less than the second predetermined value, comparing the subcooling degree with a predetermined subcooling degree; and
   in step (iii), responsive to determining that the subcooling degree is less than the predetermined subcooling degree, increasing the cumulative score by a fourth score, and responsive to determining that the subcooling degree is not less than the predetermined subcooling degree, returning to step (i).

6. The method for detecting refrigerant leakage according to claim 1, wherein the method further comprises:

determining that a predetermined time has elapsed after shutdown of the air source heat pump system;

determining that the compressor discharge pressure is less than the predetermined pressure;

comparing a compressor discharge pressure with a predetermined pressure responsive to determining that the predetermined time has elapsed after shutdown of the air source heat pump system; and determining that refrigerant leakage occurs responsive to determining that the compressor discharge pressure is less than the predetermined pressure.

7. The method for detecting refrigerant leakage according to claim 1, wherein the method further comprises, in step (ii), determining that the preset running parameter range is a preset value, a preset table, or a preset chart.

8. The method for detecting refrigerant leakage according to claim 1, further comprising:

in step (v): sending an alarm signal responsive to determining that refrigerant leakage occurs.

9. The method for detecting refrigerant leakage according to claim 2, wherein, the first predetermined value is 1 degree Celsius.

10. The method for detecting refrigerant leakage according to claim 1, wherein responsive to determining that the air source heat pump system is running in a cooling mode step (i) further comprises obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, a subcooling degree, a superheating degree, and a compressor discharge pressure.

11. The method for detecting refrigerant leakage according to claim 2, wherein, in step (ii), responsive to determining the first operating condition in the heating mode, responsive to determining the third operating condition, and responsive to determining that a degree of opening of an expansion valve is equal to a predetermined degree of opening, comparing a superheating degree with a sum of a set superheating degree value and a second predetermined value; and in step (iii), responsive to determining that the superheating degree is greater than the sum of the set superheating degree value and the second predetermined value, responsive to determining that the cumulative score is increased by a second score, and responsive to determining that the superheating degree is not greater than the sum of the set superheating degree value and the second predetermined value, returning to step (i).

12. The method for detecting refrigerant leakage according to claim 3, wherein, in step (ii), responsive to determining the first operating condition in the heating mode, responsive to determining the third operating condition, determining that the degree of opening of the expansion valve is not equal to the predetermined degree of opening, and determining that the air source heat pump system is in a defrost mode, comparing a subcooling degree obtained when the defrost mode ends with a fourth predetermined value; and in step (iii), responsive to determining that the subcooling degree is less than the fourth predetermined value, increasing the cumulative score by a fifth score, and responsive to determining that the subcooling degree is not less than the fourth predetermined value, returning to step (i).

13. The method for detecting refrigerant leakage according to claim 3, wherein, in step (ii), responsive to the first operating condition in the heating mode, responsive to the third operating condition, and responsive to determining that the degree of opening of the expansion valve is not equal to the predetermined degree of opening, forcing the air source heat pump system to enter the cooling mode and run for a predetermined time, and comparing a subcooling degree obtained after the air source heat pump system runs for the predetermined time with a fourth predetermined value; and in step (iii), responsive to determining that the subcooling degree is less than the fourth predetermined value, increasing the cumulative score by a fifth score, and responsive to determining that the subcooling degree is not less than the fourth predetermined value, returning to step (i).

14. The method for detecting refrigerant leakage according to claim 1, wherein the air source heat pump system is in a heating mode and step (i) comprises obtaining the following one or more running parameters: whether the air source heat pump system is running, a time that has elapsed after shutdown of the air source heat pump system, a time for which the air source heat pump system has been running, a water outlet temperature, a water inlet temperature, a degree of opening of an expansion valve, and whether the air source heat pump system is in a defrost mode.

15. An apparatus for detecting refrigerant leakage in an air source heat pump system, wherein the apparatus for detecting refrigerant leakage is configured to execute the method for detecting refrigerant leakage according to claim 1.

* * * * *